(12) United States Patent
Atzinger et al.

(10) Patent No.: US 8,981,313 B2
(45) Date of Patent: Mar. 17, 2015

(54) METHOD AND DEVICE FOR DETECTING X-RAY QUANTA (71) Applicant: Siemens Aktiengesellschaft, Munich (DE)

(72) Inventors: Franz Atzinger, Nuremburg (DE); Gerhard Hahm, Erlangen (DE); Raphael Henrich, Neunkirchen am Brand (DE); Carsten Illenseer, Mohrendorf (DE); Christoph Jablonski, Berlin (DE); Bernhard Sandkamp, Erlangen (DE); Markus Schild, Herzogenaurach (DE); Michael Stark, Forchheim (DE); Fabian Wloka, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 239 days.

(21) Appl. No.: 13/659,016

(22) Filed: Oct. 24, 2012

(65) Prior Publication Data

US 2013/0099127 A1 Apr. 25, 2013

(30) Foreign Application Priority Data

Oct. 24, 2011 (DE) .......................... 10 2011 085 080

(51) Int. Cl.
*G01T 1/26* (2006.01)
*G01T 1/29* (2006.01)

(52) U.S. Cl.
CPC .................................. *G01T 1/2928* (2013.01)
USPC ....................................................... 250/371

(58) Field of Classification Search
CPC ...... A61B 6/4014; A61B 6/481; A61B 6/504; G01T 1/2928

USPC ......................................................... 250/371
See application file for complete search history.

(56) References Cited

U.S. PATENT DOCUMENTS

| | | | | |
|---|---|---|---|---|
| 5,489,782 A | * | 2/1996 | Wernikoff | 250/369 |
| 5,825,033 A | | 10/1998 | Barrett et al. | 350/370.1 |
| 6,242,745 B1 | | 6/2001 | Berlad et al. | 250/370.1 |
| 6,442,235 B2 | * | 8/2002 | Koppe et al. | 378/62 |
| 6,573,507 B1 | * | 6/2003 | Agano | 250/370.09 |
| RE42,974 E | * | 11/2011 | Fossum et al. | 348/308 |
| 2001/0012328 A1 | * | 8/2001 | Koppe et al. | 378/62 |
| 2006/0086913 A1 | * | 4/2006 | Spahn | 250/580 |
| 2011/0155918 A1 | | 6/2011 | Bouhnik et al. | 250/370.14 |

FOREIGN PATENT DOCUMENTS

DE 69628858 T2 5/2004 ............. G01T 1/164

OTHER PUBLICATIONS

Korn, Alexander et al., "Investigation of Charge Carrier Transport and Charge Sharing in X-Ray Semiconductor Pixel Detectors Such as Medipix2," Nuclear Instruments and Methods in Physics Research, vol. 576, No. 1, 12 pages, Jun. 11, 2007.

* cited by examiner

*Primary Examiner* — Kiho Kim
(74) *Attorney, Agent, or Firm* — King & Spalding L.L.P.

(57) ABSTRACT

A method is provided for detecting x-ray quanta incident on a multi-pixel x-ray detector having a two-dimensional matrix composed of measurement-signal-generating pixels, wherein the multi-pixel x-ray detector is embodied as a direct solid-state detector, wherein the pixels, which generate a measurement signal within a predefined time interval and which in addition lie in a contiguous cluster composed of a plurality of pixels, are assigned to an event cluster by an evaluation unit and wherein their measurement signals are drawn upon for the purpose of approximating the position at which the x-ray quantum interacted with the multi-pixel x-ray detector.

20 Claims, 5 Drawing Sheets

METHOD AND DEVICE FOR DETECTING X-RAY QUANTA

CROSS-REFERENCE TO RELATED APPLICATIONS

This application claims priority to DE Patent Application No. 10 2011 085 080.5 filed Oct. 24, 2011. The contents of which is incorporated herein by reference in its entirety.

TECHNICAL FIELD

This disclosure relates to a method for detecting x-ray quanta which are incident on a multi-pixel x-ray detector having a two-dimensional matrix composed of measurement-signal-generating pixels. The disclosure further relates to a device which is configured for implementing the method.

BACKGROUND

X-ray radiation is used in the most diverse fields of application, inter alia also in medicine, in order, for example, to examine the structure and/or composition of objects. In addition to a suitable x-ray source, typically an x-ray tube, an x-ray detector is required for the purpose of detecting x-ray radiation.

There are various types of x-ray detectors, these differing from one another in terms of their design and their mode of operation. In conventional x-ray detectors the incident x-ray radiation causes a measurement signal to be generated which characterizes the intensity of the x-ray radiation, i.e. an average number of x-ray quanta per unit time. However, in some application areas the trend has switched increasingly toward more widespread use of what are termed "counting x-ray detectors", in which in principle each x-ray quantum produces a separate measurement signal, for which reason huge resources are currently being invested to promote their further development.

Devices known as multi-pixel x-ray detectors are generally used for a spatially resolved detection of x-ray radiation or, in the case of a counting x-ray detector, of x-ray quanta. With these, a measurement signal is generated in each pixel whenever x-ray radiation or an x-ray quantum in the region of the corresponding pixel interacts with the x-ray detector. In this way all the measurement signals can be assigned to a relative position on the x-ray detector corresponding to the relative position of the associated pixel. A problematic aspect here is that x-ray radiation, or an x-ray quantum which interacts with the x-ray detector in the border region between multiple pixels, sometimes generates measurement signals in a plurality of pixels, thereby making it difficult to assign the corresponding event to a specific pixel. If such events are nonetheless taken into account, the effective resolution capacity is ultimately reduced as a consequence. If, on the other hand, such events are ignored, the result is a reduction in the quantum yield of the x-ray detector.

SUMMARY

In one embodiment, a method is provided for detecting x-ray quanta which are incident on a multi-pixel x-ray detector having a two-dimensional matrix composed of measurement-signal-generating pixels, wherein the multi-pixel x-ray detector is embodied as a direct solid-state detector, wherein the pixels, which generate a measurement signal within a predefined time interval and which in addition lie in a contiguous cluster composed of a plurality of pixels, are assigned to an event cluster by an evaluation unit, and wherein their measurement signals are drawn upon for the purpose of approximating the position at which the x-ray quantum interacted with the multi-pixel x-ray detector.

In a further embodiment, the multi-pixel x-ray detector comprises an absorption layer, an adjoining pixel matrix composed of pixels for generating the measurement signals and an evaluation unit for evaluating the measurement signals generated by the pixels, wherein each measurement signal represents a measure for the charge carrier quantity which was generated in the absorption layer and in the region of the measurement-signal-generating pixel and which led to the generation of the corresponding measurement signal. In a further embodiment, for the purpose of approximating the position the measurement signals of an event cluster in the evaluation unit are drawn upon in order to perform a mathematical determination of the center of mass. In a further embodiment, a maximum spatial event cluster size is specified and wherein the measurement signals of the pixels which generate a measurement signal within the time interval and which lie in an event cluster larger than the maximum spatial event cluster size are rated as faulty measurement signals by the evaluation unit and are not evaluated. In a further embodiment, a minimum spatial event cluster size is specified and wherein the measurement signals of the pixels which generate a measurement signal within the time interval and which lie in an event cluster smaller than the minimum spatial event cluster size are rated as faulty measurement signals by the evaluation unit and are not evaluated. In a further embodiment, given a pixel size of d only the measurement signals of an event cluster having a spatial event cluster size between 2 d and 16 d are rated as non-faulty measurement signals and are evaluated. In a further embodiment, the measurement signals of all pixels of an event cluster are drawn upon by the evaluation unit in addition for determining the energy of the x-ray quantum which triggered the generation of the measurement signals. In a further embodiment, the pixels have a pixel size d less than 100 µm, e.g., less than 40 µm. In a further embodiment, the pixels of the pixel matrix comprise CMOS semiconductor components. In a further embodiment, a dedicated amplifier circuit is provided for each pixel and is integrated into the respective pixel.

In another embodiment, a device for detecting x-ray quanta having a multi-pixel x-ray detector comprises an absorption layer, a pixel matrix composed of measurement-signal-generating pixels and an evaluation unit, wherein the evaluation unit is configured in such a way that a method as claimed in one of the preceding claims can be implemented therewith.

BRIEF DESCRIPTION OF THE DRAWINGS

Example embodiments will be explained in more detail below with reference to figures, in which.

DETAILED DESCRIPTION

Some embodiments provide an effective method for the spatially resolved detection of x-ray quanta. Other embodiments provide a detector configured to implement such a method.

The method serves for detecting x-ray quanta which are incident on a multi-pixel x-ray detector having a two-dimensional matrix composed of measurement-signal-generating pixels, the multi-pixel x-ray detector being embodied as a direct solid-state detector and in particular as a semiconductor detector. For that purpose, the pixels which generate a measurement signal within a predefined time interval and which in addition lie in a contiguous cluster composed of a plurality of pixels are assigned to an event cluster by an evaluation unit. The measurement signals of the pixels of such an event cluster are evaluated as correlated by the evaluation unit and as a consequence drawn upon to reach an approximation of the position at which the x-ray quantum interacted with multi-pixel x-ray detector. It is assumed in this case that an incident x-ray quantum generally also affects a number of adjacent pixels, with the result that each of these generates a measurement signal. These measurement signals are subsequently used to estimate at which point the x-ray quantum struck the multi-pixel x-ray detector. The approximation is in this case carried out in particular with the aid of a suitable algorithm. The measurement signals are therefore subjected to a common computational operation in order to determine the point of incidence of the x-ray quantum.

In some embodiments the multi-pixel x-ray detector comprise an absorption layer having a layer thickness of for example 1000 µm to 2000 µm, an adjoining two-dimensional pixel matrix for generating the measurement signals, and an evaluation unit for evaluating the measurement signals generated by the pixels, wherein each measurement signal represents a measure for the charge carrier quantity which was generated in the absorption layer and in the region of the pixel generating the measurement signal, and which resulted in the generation of the corresponding measurement signal. Thus, additional information suitable for increasing the effectiveness of the spatially resolved detection can be obtained from the measurement signals. The absorption layer may be fabricated from a semiconductor material, for example cadmium telluride (CdTe) or another compound semiconductor with comparable bandgap, so that x-ray quanta which penetrate into the absorption layer generate there in particular electron-hole pairs which are used as additional free charge carriers and consequently as a generated charge carrier quantity for generating a measurement signal.

According to one embodiment, a value less than 50 ns is set for the predefined time interval. With the aid of said time interval it is intended to avoid a situation in which multiple x-ray quanta contribute toward the generation of a measurement signal, since in this case it proves much more difficult to reach an approximation. When choosing a desired value for the time interval it may be important to take two aspects into consideration. As the intensity of the x-ray radiation increases, the size of the time interval should ideally decrease since there is an increased probability that a plurality of x-ray quanta will strike the multi-pixel x-ray detector close to one another both in space and in time. At the same time it is usually necessary to provide a minimum size for the time interval in order to ensure that the desired influencing of adjacent pixels by an x-ray quantum is channeled completely into the generation of the measurement signals and that just these measurement signals are also evaluated as correlated by the evaluation unit. Factors to be taken into account here in addition to the drift velocity of the charge carriers of the generated charge carrier quantity in the absorption layer are also response times, switching times or dead times of electronic components used.

According to a further embodiment, the approximation of the position at which the x-ray quantum interacted with the multi-pixel x-ray detector is performed according to the principle of a mathematical determination of the center of mass for a finite set of discrete mass points. In this a separate determination of the center of mass may be carried out for each event cluster. In this case the relative position of the individual pixels to one another acts as the spatial distribution and the measurement signals generated by the pixels as the mass distribution. Depending on the information content of the measurement signals, it is alternatively provided to use individual items of information from the measurement signals as the mass distribution, such as, for example, the metric for the generated charge carrier quantity which led to the generation of the corresponding measurement signal.

By using a method of said type for the spatially resolved detection of x-ray quanta it is furthermore possible to achieve a resolution capability which is higher than the resolution capability, limited by the pixel size, of the pixel matrix used and hence of a conventional multi-pixel x-ray detector. According to a variant of the method a procedure is therefore followed whereby each real pixel is replaced for the purpose of the evaluation by four virtual pixels, with each event being assigned, not to a real pixel, but to a virtual pixel. In this case the assignment is performed on the basis of a mathematical determination of the center of mass which in principle is arbitrarily precise and accordingly assigns each event, not to a real pixel, but rather to a mathematical point. For the purpose of the corresponding mathematical determination of the center of mass, the measurement signals of the event cluster belonging to the event are drawn upon in this case. In a simplified variant a geometric midpoint determination for example is provided as an alternative to the center of mass determination.

Some embodiments utilize more complex algorithms for evaluating the measurement signals in order, for example, to identify and filter out what are known as "k-escapes". In an interaction of an x-ray quantum with the semiconductor material of the absorption layer, an induced emission of what is termed characteristic x-ray radiation ("k-escapes") or secondary radiation may also occur instead of the desired generation of a charge carrier quantity. This can move away from the site of the original event before it in turn interacts with the semiconductor material and generates a charge carrier quantity. However, the measurement signals resulting therefrom distort the detected spatial resolution of the primary radiation, i.e. of the x-ray radiation that is to be detected, and should therefore be filtered out. With a greater number of pixels of an event cluster it is for example provided for this purpose to analyze the shape of the cluster associated with the event cluster. If the cluster has a shape deviating from a circle-like shape, i.e. has a bulge for example, then it is assumed that the measurement signals of this event cluster are affected by secondary radiation, for which reason these measurement signals are not evaluated further.

According to another embodiment, a maximum spatial event cluster size is specified. The measurement signals of the pixels which generate a measurement signal within the time interval and which lie in an event cluster larger than the maximum spatial event cluster size are then rated by the evaluation unit as faulty measurement signals and are not evaluated. In this case it is assumed that a plurality of x-ray quanta have been incident close to one another on the multi-pixel x-ray detector within the time interval, with the result that their event clusters overlay one another. To ensure that such events do not lead to a reduction in the spatial resolution it would be necessary in such a case to obtain an approximation of two positions, in particular two centers of mass. In the interests of the simplest possible evaluation, however, provision is made instead for the measurement signals occurring during such an event to be effectively ignored.

In one embodiment a minimum spatial event cluster size is specified and in which the measurement signals of the pixels which generate a measurement signal within the time interval and which lie in an event cluster smaller than the minimum spatial event cluster size are rated as faulty measurement signals by the evaluation unit and are not evaluated. This variant is based on the consideration that such measurement signals are not caused by an x-ray quantum, but for example by effects such as pixel noise. However, this variant may only be advantageous when the probability is very low that an x-ray quantum is the cause for an event cluster having a spatial event cluster size smaller than the minimum spatial event cluster size. Otherwise, specifying a minimum spatial event cluster size may be disadvantageous and therefore not provided. In this case it also happens that only one pixel belongs to an event cluster.

In one embodiment, only the measurement signals of an event cluster having a spatial event cluster size between 2 d and 16 d are rated as non-faulty measurement signals and are evaluated. Here, d stands for the pixel size which is given by the diameter of the incircle of the shape of a pixel. This makes further allowance for the specified objective of simplifying the approximation to the maximum possible extent.

Furthermore, in one embodiment the pixels have a pixel size d less than 100 µm, e.g., less than 40 µm. With such a pixel size d it is possible on the one hand to achieve a good spatial resolution, while on the other hand the signal-to-noise ratio is entirely satisfactory.

According to a further embodiment, the measurement signals of the pixels which generate a measurement signal within the time interval and which lie in an event cluster may be alternatively or additionally cumulated in an intermediate step and linked together in order to generate an overall signal. If this overall signal deviates from a preset value, the measurement signals and the overall signal are rated as faulty signals by the evaluation unit and not evaluated further. If, therefore, an x-ray detector having an absorption layer is used for example, wherein an incident x-ray quantum generates in the absorption layer a charge carrier quantity proportional to the energy of the x-ray quantum and wherein each charge carrier quantity produces an overall signal which is proportional to the charge carrier quantity, and if, for example, two x-ray quanta are incident on the x-ray detector in spatial proximity to one another within the time interval, such that subsequently precisely one event cluster develops, then in this case an overall signal is generated which is proportional to the sum of the energies of the two x-ray quanta. If monochromatic x-ray radiation is now to be detected, there is chosen for example as a preset for the overall signals a value range which lies symmetrically about the value which represents the energy of said monochromatic x-ray radiation, but which excludes the value which represents twice the energy of said monochromatic x-ray radiation. In this way events in which x-ray quanta are incident on the x-ray detector in unfavorable spatial proximity to one another within the time interval are ignored.

In one embodiment, the pixels of the pixel matrix comprise CMOS semiconductor components, wherein a dedicated amplifier circuit is provided for each pixel and is integrated into the respective pixel. In one embodiment the pixels are realized by means of active pixel sensors (APS), also known as CMOS sensors. Sensors of said type can be linked in a particularly simple manner to suitable readout electronics, such that it is possible by this means to produce a multi-pixel x-ray detector suitable for implementing the method with a relatively small outlay in terms of costs and manufacturing resources.

Alternatively to a 2D representation of the local distribution of the detected x-ray quanta, in which for a simplified visualization the approximated positions at which the x-ray quanta have interacted with the multi-pixel x-ray detector, are each assigned to a pixel of the pixel matrix, it is provided simply to record the positions and buffer them in an information memory for subsequent post processing.

Other embodiments provide a suitable detector for implementing any of the methods disclosed herein. For example, the detector may be embodied as a multi-pixel x-ray detector that operates according to the principle of a direct solid-state detector, and comprises a two-dimensional matrix composed of measurement-signal-generating pixels as well as an evaluation unit which is configured to perform the any of the methods disclosed herein.

Figure 1:
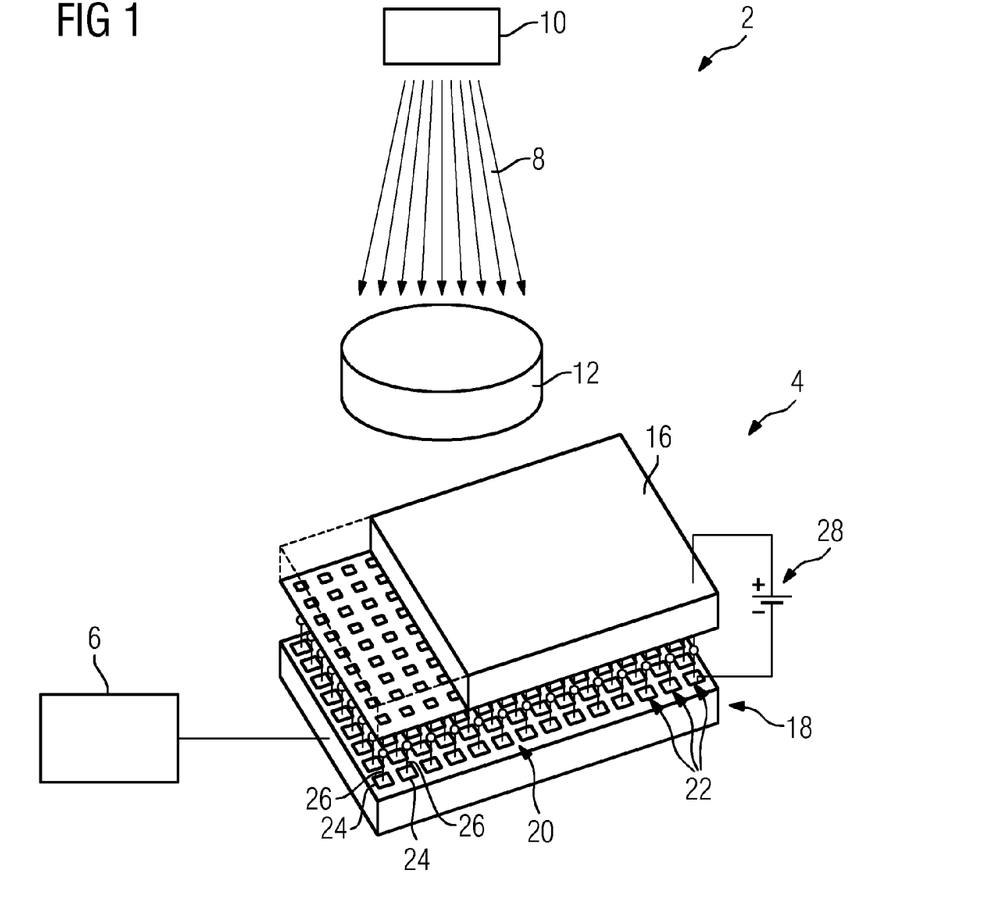
FIG. 1 shows an examination arrangement comprising an x-ray source and a multi-pixel x-ray detector.

The method may be implemented with the aid of an examination arrangement 2 as outlined in FIG. 1, which comprises a multi-pixel x-ray detector 4 and an evaluation unit 6 connected thereto for signal processing purposes, the arrangement being provided for detecting x-ray quanta 8 which are generated in an x-ray source 10, are subsequently transmitted in the direction of an object 12 that is to be examined, and are finally incident on the multi-pixel x-ray detector 4.

Figure 2:
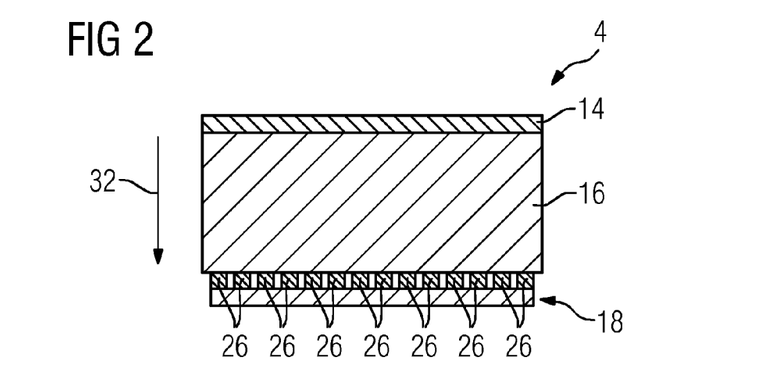
FIG. 2 shows a cross-section of the multi-pixel x-ray detector.

In the example embodiment according to FIG. 2, the multi-pixel x-ray detector 4 has a three-tier structure and is implemented as a digital x-ray detector. The first or topmost tier facing toward the x-ray source 10 acts as a protective layer 14 which shields the underlying tiers against air, moisture and dirt particles. Adjoining the first tier is the second tier, the absorption layer 16, which is fabricated from a compound semiconductor material, in this case cadmium telluride (CdTe). The third tier forms a chip 18, built inter alia from CMOS semiconductor components, which houses a so-called "application-specific integrated circuit" (ASIC) and is subdivided into readout cells in order to embody a pixel matrix 20 composed of measurement-signal-generating pixels 22. Considered a readout cell in this context is a subvolume of the chip 18 which encloses precisely one pixel 22, including all semiconductor components assigned to said pixel 22.

The individual pixels 22 of the pixel matrix 20 may be identical in structure, each pixel 22 comprising a square electrode 24 and a current amplifier circuit connected downstream of the electrode 24. Each individual electrode 24 is connected to the absorption layer 16 in an electrically conductive manner by way of an electrical contact 26 and during operation of the multi-pixel x-ray detector 4 a potential difference in the kV range, in the exemplary embodiment 1000 V, is built up and maintained by means of a voltage source 28 between the absorption layer 16 and each individual electrode 24.

Figure 3:
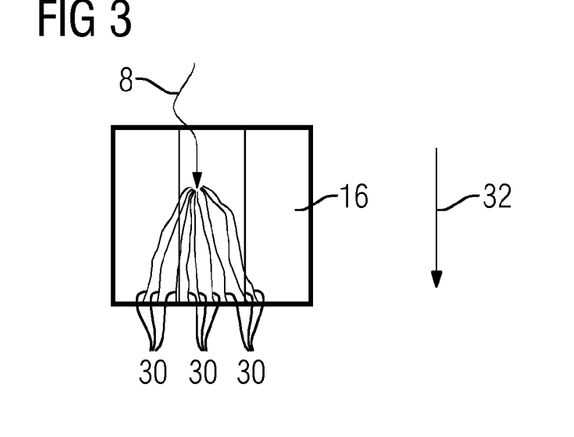
FIG. 3 shows a simplified representation of the functional principle of the multi-pixel x-ray detector.

If x-ray quanta 8 now strike the multi-pixel x-ray detector 4, they pass virtually unimpeded through the protective layer 14 into the absorption layer 16. There, the x-ray quanta 8 interact with the semiconductor material, in this case CdTe, and in so doing generate a charge carrier quantity composed of additional free charge carriers 30, in particular electron-hole pairs. On account of the potential difference present, those charge carriers 30 drift, as indicated in FIG. 3, in the direction of the pixel matrix 20. If a fraction of the charge carrier quantity reaches a pixel 22 of the pixel matrix 20, said fraction generates a current pulse in the corresponding pixel 22, which current pulse is then amplified by means of the current amplifier circuit of the corresponding pixel 22 in order to form a measurement signal. In this case the amplification of the current pulse is effected in the same way in every pixel 22 of the pixel matrix 20, with the result that the charge carrier quantity which led to the generation of the measurement signal in the corresponding pixel 22 can be inferred from each measurement signal.

In addition to the drift, caused by the potential difference, of the charge carriers 30 in the layer sequence direction 32 of the multi-pixel x-ray detector 4 there is also a drift transversely to the layer sequence direction 32, such that the distribution of the charge carriers 30 spreads increasingly and isotropically in the direction of the pixel matrix 20.

In conventional techniques, the expansion of the pixels 22 of the pixel matrix 20 transversely to the layer sequence direction 32 is chosen such that virtually the entire charge carrier quantity generated by an x-ray quantum 8 is incident on precisely one pixel 22 and there produces a measurement signal. In contrast, the expansion of the pixels 22 of the pixel matrix 20 according to the concept presented here is specified in structural terms in such a way that the charge carrier quantity generated by an x-ray quantum 8 is, with a high level of probability, distributed over a plurality of adjacent pixels 22 of the pixel matrix 20 and in each of said pixels 22 produces a measurement signal reflecting the fraction of the charge carrier quantity which was incident on the corresponding pixel 22. The expansion of any pixel 22 of the pixel matrix 20 transversely to the layer sequence direction 22 is in this case adjusted to the expansion of the absorption layer 16 in the layer sequence direction 32. If d stands for the pixel size given by the diameter of the incircle of the shape of a pixel 22, then a value less than 30 μm, and in the exemplary embodiment a value of 25 μm, may be specified for d, for example.

Figure 4:
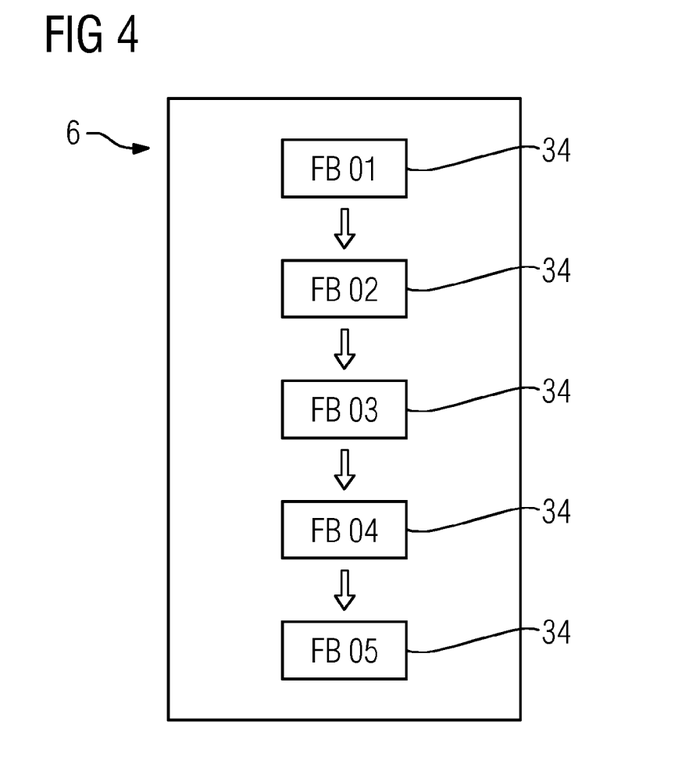
FIG. 4 shows an evaluation unit in the manner of a block diagram.

The measurement signals generated in the pixels 22 are beneficially digitized in the chip 18 and subsequently supplemented by spatial information representing the relative position of the pixel 22 in which the corresponding measurement signal was generated within the pixel matrix 20. The measurement signals supplemented in this way are sent to the evaluation unit 6, where they are processed with the aid of different function blocks 34 as shown in FIG. 4.

A first function block FB 01 serves to establish the coincidence in time. Here, those measurement signals generated within a predefined time interval, in the exemplary embodiment 1 μs, are linked together and passed on as a dataset to a second function block FB 02. A spatial coincidence is established with the aid of said second function block FB 02. In the process those measurement signals of the dataset which were generated by pixels 22 lying in a cluster composed of adjacent pixels 22 and accordingly mapping a contiguous surface area without gaps, are rated as correlated and assigned to an event cluster 36 (cf. FIG. 5). Expressed in different terms, it is assumed that an individual x-ray quantum 8 led to the generation of precisely these measurement signals.

The measurement signals assigned to an event cluster 36 are subsequently supplied to a third function block FB 03 and there subjected to a discrimination function. In the process the measurement signals of an event cluster 36 whose spatial event cluster size is either larger than a predefined maximum spatial event cluster size or smaller than a predefined minimum spatial event cluster size are rated as faulty measurement signals and are not evaluated further.

Otherwise, the information of an event cluster 36 is referred to in a fourth function block FB 04 for the purpose of approximating the position at which the x-ray quantum 8, which led to the formation of the event cluster 36, interacted with the multi-pixel x-ray detector 4. In this case the approximation is performed in accordance with the principle of a mathematical determination of the center of mass for a discrete distribution of mass points, wherein the spatial distribution is given by the relative position of the individual pixels 22 within the pixel matrix 20 and the mass is replaced by that information of the measurement signal which indicates the charge carrier quantity which was incident on the corresponding pixel 22. The thus determined positions or centers of mass of the event clusters 36 are finally used in a fifth function block FB 05 in order to generate a visual representation reflecting the spatial distribution of the detected x-ray quanta 8.

Figure 5:
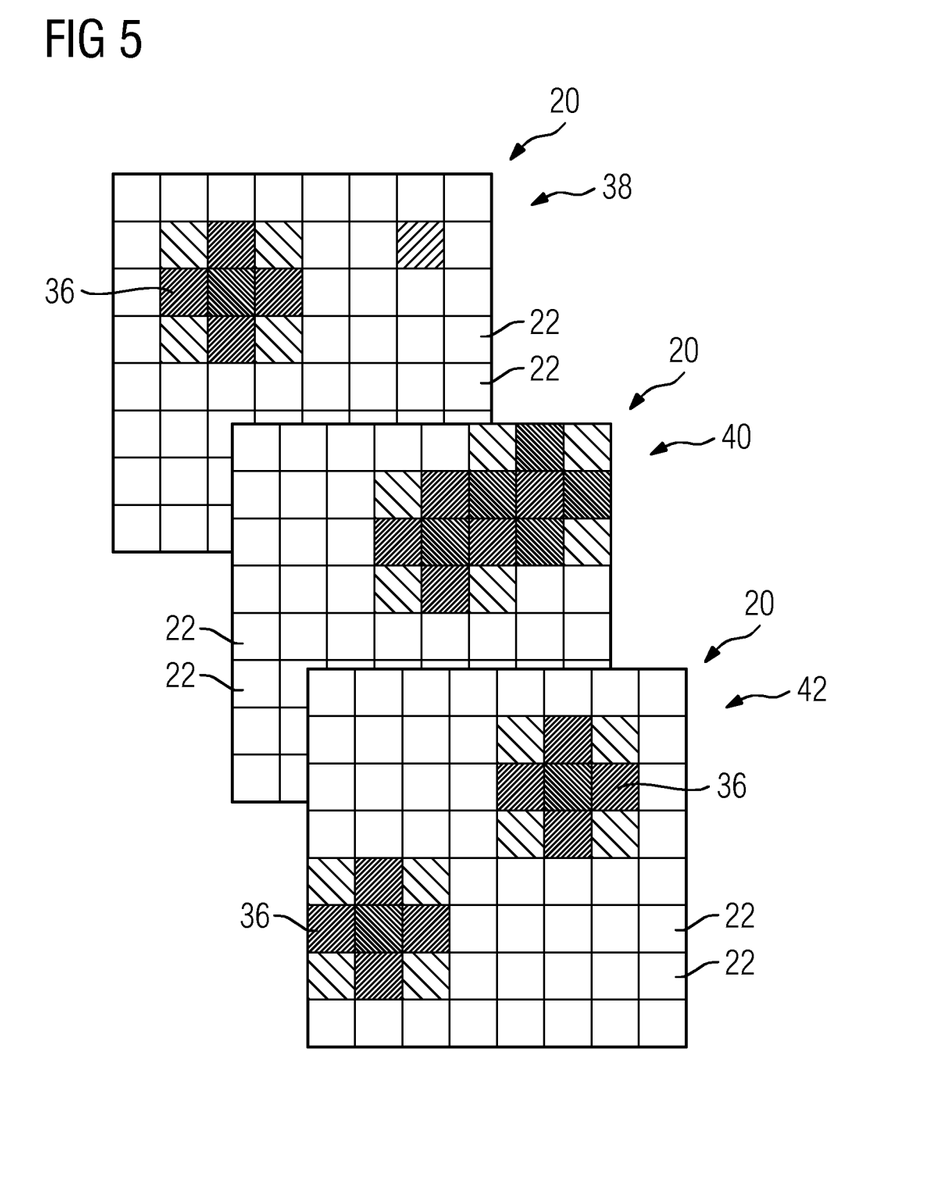
FIG. 5 shows a graphic representation of different event clusters.

With the aid of the specification of a minimum and a maximum event cluster size, the measurement signals are filtered in such a way that under given preconditions measurement signals are ignored or deleted and consequently not fully evaluated. FIG. 5 provides a graphical illustration of three possible scenarios on the basis of which the selection criteria are particularly easy to reconstruct. The graphic depicts the pixel matrix 20 composed of individual square pixels 22, with some of the pixels 22 being hatched in order to symbolize that the respective pixel 22 has generated a measurement signal within the time interval. In this case the density of the hatching is a measure for the charge carrier quantity which led to the generation of the measurement signal.

In the first scenario 38 a single hatched pixel 22 can be seen which is completely surrounded by pixels 22 having no hatching at all. The measurement signal of said hatched pixel 22 is rated as unusable or faulty, because the condition of the minimum event cluster size is not met. A measurement signal of said type may be caused for example by a phenomenon known as pixel noise. The cluster composed of hatched pixels 22 in the second scenario 40, in contrast, does not meet the condition of the maximum spatial event cluster size, for which reason the measurement signals of the pixels 22 of said cluster are likewise rated as unusable or faulty and are not evaluated further. It is assumed in this case that the cluster represents a spatial overlaying of two event clusters 36, as a result of which the measurement signals of the pixels 22 of this cluster are not suitable for a simple determination of the center of mass. The third scenario 42, finally, shows two clusters, spatially separated from one another, composed of hatched pixels 22, whose spatial event cluster size in each case lies within the predefined range, so that each of the two cluster are considered as event clusters 36 suitable for approximation. Accordingly, the measurement signals of the pixels 22 of these two clusters are evaluated.

The algorithm used for approximating the position at which the x-ray quantum 8 interacted with the multi-pixel x-ray detector 4 can be summarized as follows.

Figure 6:
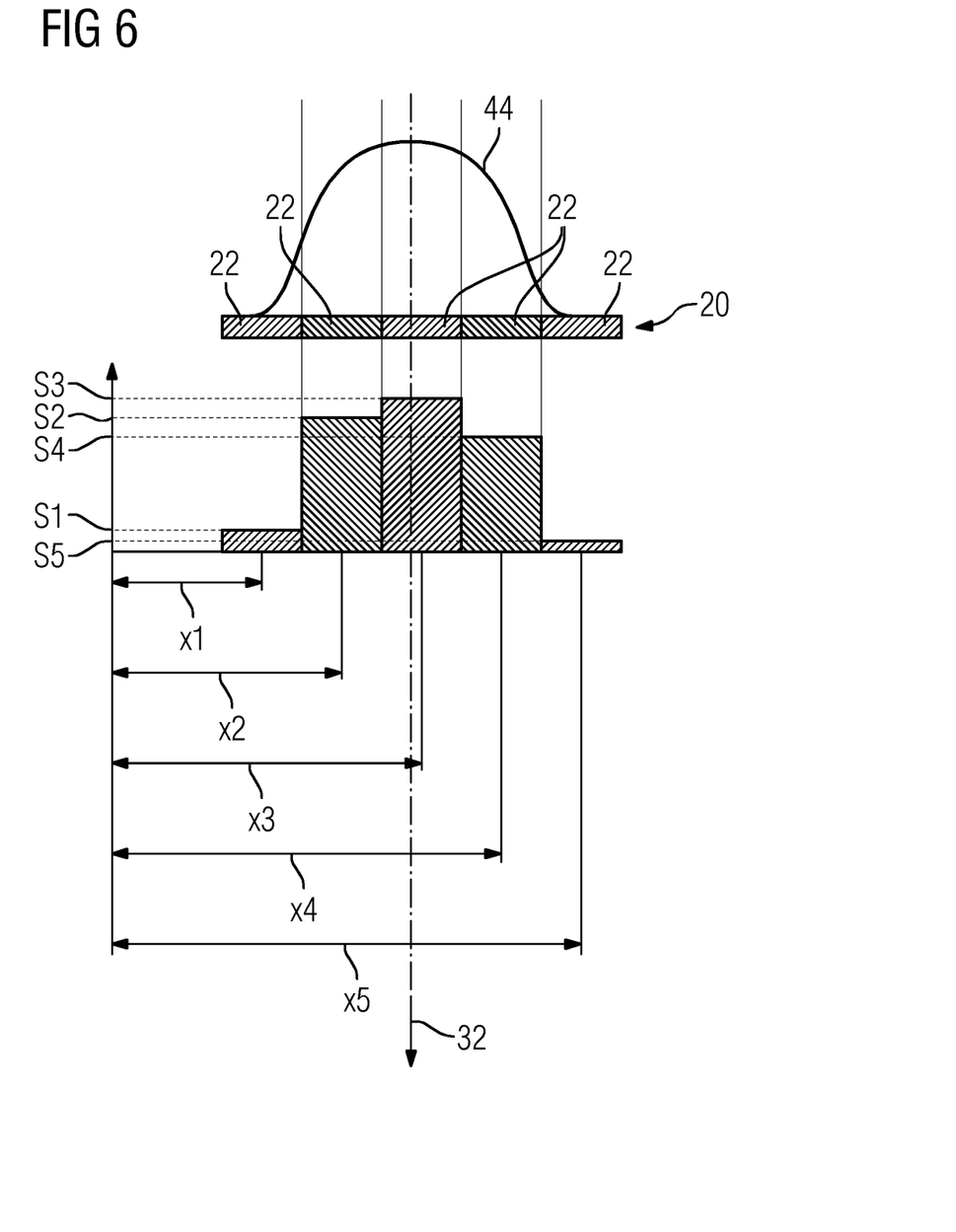
FIG. 6 shows a graphic representation of a mass point distribution.

If an x-ray quantum 8 interacts with the semiconductor material in the absorption layer 16, charge carriers 30 are generated which, due to the predefined potential difference, drift in the layer sequence direction 32 toward the pixel matrix 20. In addition the charge carriers 30 spread out isotropically transversely to the layer sequence direction 32, as a result of which the distribution 44 of the charge carriers 30 transversely to the layer sequence direction 32 over the pixel matrix 20 can be represented approximately by means of a bell curve whose maximum lies at a point which can be mapped by means of projection in the layer sequence direction 32 onto the position at which the x-ray quantum 8 interacted with the semiconductor material. The pixels 22 on which a part of the charge carrier quantity is incident each generate a measurement signal which represents the charge carrier quantity which led to the generation of the respective measurement signal. By way of example a measurement signal is indicated in FIG. 6 by means of a voltage S (as a measure for the light quantity). In the determination of the center of mass, the corresponding voltage values, given by way of example in FIG. 5 by the values $S_1$ to $S_5$ replace the mass values, with the result that the center of mass and consequently the approximated position $X_S$ of the x-ray quantum 8 is given by:

$$X_s = \frac{1}{\sum\limits_{i=1}^{s} S_i} \sum\limits_{i=1}^{s} S_i \times X_i$$

In this case the values $X_i$ stand for the relative positions of the individual pixels 22 within the pixel matrix 20. The procedure for determining the center of mass in the two-dimensional case is performed analogously.

Since the charge carrier quantity, i.e. the number of charge carriers 30 generated as a result of interaction between an x-ray quantum 8 and the semiconductor material, is dependent on the energy of the x-ray quantum 8, the energy of the x-ray quantum 8 can also be deduced in addition from the charge carrier quantity and ultimately also from the measured values. Toward that end the measurement signals of the pixels 22 of an event cluster 36 are additionally evaluated collectively, for example superposed, and accordingly not only the position, in other words the center of mass of the event cluster 36, is determined, but also the energy of the x-ray quantum 8 which is responsible for the corresponding event cluster 36.

Also stored for the multi-pixel x-ray detector 4 in the exemplary embodiment is a threshold value for the intensity of the x-ray radiation, i.e. the number of x-ray quanta 8 that are incident per unit of time and per unit area on the multi-pixel x-ray detector 4. If this threshold value is exceeded, there is a great probability that a plurality of event clusters 36 will overlay one another, as per the illustration of the second scenario 40 from FIG. 5. A simple determination of the center of mass and in particular the separate metrological acquisition of any x-ray quantum 8 are then no longer possible. In this case a visual or audible warning signal is output by way of the evaluation unit 6 to alert an operator. The operator then still has the option to switch over the operating mode for the multi-pixel x-ray detector 4 and the evaluation unit 6 so that thereafter for example a simplified intensity measurement of the x-ray radiation will be performed by means of the multi-pixel x-ray detector 4 and the evaluation unit 6. In this case the measurement signals generated in a pixel 22 may be integrated over a longer period of time so that a type of current value averaged over time is recorded for each pixel 22, said current value representing the intensity of the x-ray radiation which interacted during the corresponding time period with the semiconductor material in the region of the corresponding pixel 22. If, on the other hand, the evaluation electronics are simply too slow for a given intensity of the x-ray radiation, provision is made instead for a switch from a continuous operating mode to a periodic operating mode, wherein in the case of the periodic operating mode the measurement and evaluation are carried out at regular intervals during a predefined time period of for example 1 μs.

Figure 7:
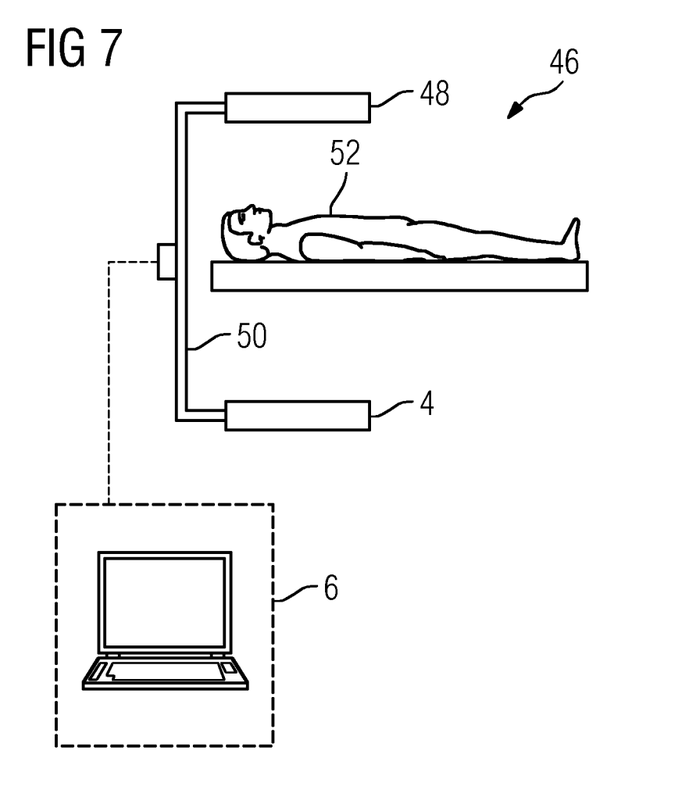
FIG. 7 shows a greatly simplified block diagram representation of an x-ray system.

The described method may be used for an x-ray system 46 as shown schematically in FIG. 7. The x-ray system 46 comprises an x-ray tube 48 opposite which the multi-pixel x-ray detector 4 is arranged. In the exemplary embodiment, x-ray tube 48 and multi-pixel x-ray detector 4 are directly connected to each other, in particular by way of a C-arm 50. The x-ray system 46 is employed for diagnostic purposes in particular in the medical field. In such an application radiation is passed through a patient 52 for examination purposes. The transmitted x-ray radiation is measured by the multi-pixel x-ray detector 4 and the measurement signals are transmitted to the evaluation unit 6 for the purpose of generating diagnostic images. The evaluation of the measurement signals transmitted by the multi-pixel x-ray detector 4 to the evaluation unit 6 can optionally take place either immediately during the examination or else at a later time.

The disclosure is not limited to the exemplary embodiment described hereintofore. Rather, other variants can also be derived here from by the person skilled in the art, without departing from the subject matter of the invention. In particular it is furthermore possible to combine all the individual features described in connection with the example embodiment with one another in a different way also, without departing from the subject matter of the invention.

What is claimed is:

1. A method for detecting x-ray quanta incident on a multi-pixel x-ray detector having a two-dimensional matrix composed of measurement-signal-generating pixels, wherein the multi-pixel x-ray detector is embodied as a direct solid-state detector, the method comprising:
    receiving measurement signals from at least some of the pixels,
    automatically identifying a subset of pixels that generate a measurement signal within a predefined time interval and which lie in a contiguous multi-pixel cluster,
    automatically assigning the identified subset of pixels in the contiguous multi-pixel cluster to an event cluster,
    determining at least one of a size and a share of the contiguous multi-pixel cluster,
    evaluating the at least one of a size and shape of the contiguous multi-pixel cluster,
    determining whether the measurement signals of the identified subset of pixels are valid or faulty based on the evaluation of the at least one of a size and a shape of the contiguous multi-pixel cluster, and
    if the measurement signals of the identified subset of pixels are determined as valid, approximating a position at which an x-ray quantum interacted with the multi-pixel x-ray detector based on the measurement signals of the identified subset of pixels.

2. The method according to claim 1, wherein:
    the multi-pixel x-ray detector comprises an absorption layer, an adjoining pixel matrix composed of pixels for generating the measurement signals, and an evaluation unit for evaluating the measurement signals generated by the pixels, and
    each measurement signal represents a measure for the charge carrier quantity that was generated in the absorption layer and in the region of the measurement-signal-generating pixel and which led to the generation of the corresponding measurement signal.

3. The method according to claim 1, wherein the evaluation unit approximates the position at which an x-ray quantum interacted with the multi-pixel x-ray detector by mathematically determining a center of mass based on the measurement signals of the identified subset of pixels.

4. The method according to claim 1, wherein:
a maximum spatial event cluster size is specified, and
the measurement signals of the identified subset of pixels are determined as faulty if the event cluster is larger than the specified maximum spatial event cluster size.

5. The method according to claim 1, wherein:
a minimum spatial event cluster size is specified, and
the measurement signals of the identified subset of pixels are determined as faulty if the event cluster is smaller than the specified minimum spatial event cluster size.

6. The method according to claim 1, wherein:
a pixel size of d is specified, and
the measurement signals of the identified subset of pixels are determined as valid only if a determined size of the event cluster is between 2d and 16d.

7. The method according to claim 1, further comprising determining an energy of the x-ray quantum based on the measurement signals of the identified subset of pixels.

8. The method according to claim 1, wherein the individual pixels have a pixel size d less than 100 μm.

9. The method according to claim 1, wherein the pixels of the pixel matrix comprise CMOS semiconductor components.

10. The method according to claim 1, wherein a dedicated amplifier circuit is integrated into each pixel.

11. A device for detecting x-ray quanta having a multi-pixel x-ray detector comprising:
an absorption layer,
a pixel matrix composed of measurement-signal-generating pixels, and an evaluation unit configured to:
automatically identify a subset of pixels that generate a measurement signal within a predefined time interval and which lie in a contiguous multi-pixel cluster,
automatically assign the identified subset of pixels in the contiguous multi-pixel cluster to an event cluster,
determine at least one of a size and a shape of the contiguous multi-pixel cluster,
evaluate the at least one of a size and a shape of the contiguous multi-pixel cluster,
determine whether the measurement signals of the identified subset of pixels are valid or faulty based on the evaluation of the at least one of a size and a shape of the contiguous multi-pixel duster, and
if the measurement signals of the identified subset of pixels are determined as valid, automatically approximate a position at which an x-ray quantum interacted with the multi-pixel x-ray detector based on the measurement signals of the identified subset of pixels.

12. The device according to claim 11, wherein;
the multi-pixel x-ray detector comprises an absorption layer, an adjoining pixel matrix composed of pixels for generating the measurement signals, and an evaluation unit for evaluating the measurement signals generated by the pixels, and
each measurement signal represents a measure for the charge carrier quantity that was generated in the absorption layer and in the region of the measurement-signal-generating pixel and which led to the generation of the corresponding measurement signal.

13. The device according to claim 11, wherein the evaluation unit is configured to approximate the position at which an x-ray quantum interacted with the multi-pixel x-ray detector by mathematically determining a center of mass based on the measurement signals of the identified subset of pixels.

14. The device according to claim 11, wherein:
a maximum spatial event cluster size is specified, and
the measurement signals of the identified subset of pixels are determined as faulty if the event cluster is larger than the specified maximum spatial event cluster size.

15. The device according to claim 11, wherein:
a minimum spatial event duster size is specified, and
the evaluation unit is configured to determine the measurement signals of the identified subset of pixels as faulty if the event cluster is smaller than the specified minimum spatial event cluster size.

16. The device according to claim 11, wherein:
a pixel size of d is specified, and
the evaluation unit is configured to determine the measurement signals of the identified subset of pixels as valid only if a determined size of the event cluster is between 2d and 16d.

17. The device according to claim 11, wherein the evaluation unit is further configured to determine an energy of the x-ray quantum based on the measurement signals of the identified subset of pixels.

18. The device according to claim 11, wherein the individual pixels have a pixel size d less than 100 μm.

19. The device according to claim 11, wherein the pixels of the pixel matrix comprise CMOS semiconductor components.

20. The device according to claim 11, wherein a dedicated amplifier circuit is integrated into each pixel.

* * * * *